March 3, 1964 — R. A. KAENEL — 3,123,670
MULTIPHASE DATA SYSTEM
Filed June 18, 1962 — 4 Sheets-Sheet 1

INVENTOR
R. A. KAENEL
BY J. P. Kearns
ATTORNEY

March 3, 1964 — R. A. KAENEL — 3,123,670
MULTIPHASE DATA SYSTEM
Filed June 18, 1962 — 4 Sheets-Sheet 2

INVENTOR
R. A. KAENEL
BY J. P. Kearns
ATTORNEY

March 3, 1964 R. A. KAENEL 3,123,670
MULTIPHASE DATA SYSTEM
Filed June 18, 1962 4 Sheets-Sheet 3

INVENTOR
R. A. KAENEL
BY
*J. P. Kearns*
ATTORNEY

March 3, 1964 R. A. KAENEL 3,123,670
MULTIPHASE DATA SYSTEM
Filed June 18, 1962 4 Sheets-Sheet 4

INVENTOR
R. A. KAENEL
BY
*J.P. Kearns*
ATTORNEY

United States Patent Office 3,123,670
Patented Mar. 3, 1964

3,123,670
MULTIPHASE DATA SYSTEM
Reginald A. Kaenel, Murray Hill, N.J., assignor to Bell Telephone Laboratories, Incorporated, New York, N.Y., a corporation of New York
Filed June 18, 1962, Ser. No. 203,196
14 Claims. (Cl. 178—66)

This invention relates to phase encoding systems and in particular to the communication of intelligence by means of a multiplicity of phases.

Multiphase data signals have been found to exhibit desirable characteristics for reliable data transmission. An important feature of these signals is that an equal amount of energy is present in each transmitted signal element. Therefore, the transmission system is operated at maximum efficiency. In addition, the error probability pattern is made uniform. There is no more likelihood that one particular type of signal element will be more susceptible to noise degradation than any other. Another feature is that multiphase signals have a double-sided spectral distribution and are therefore less vulnerable to delay distortion than single-sided spectrum signals. A further feature is that double-sided spectral signals are easier to demodulate. A still further feature is the economy of bandwidth possible in transmitting multiphase signals. This invention exploits these desirable features in a unique and flexible matched filter double-sideband transmission system.

It is an object of this invention to facilitate the encoding of digital and analog multiphase signals for transmission over narrow-band facilities.

It is another object of this invention to convert multiphase signals into two-phase double-sideband amplitude-modulation form in a simple and economical fashion.

It is yet another object of this invention to reconvert a two-phase double-sideband amplitude-modulation signal into multiphase form.

It is still another object of this invention to encode and decode a data alphabet as a multiplicity of discrete phases.

It is a further object of this invention to encode and decode multiphase signals by the use of substantially the same apparatus components and without requiring switching means.

According to one aspect of this invention a data alphabet comprising any number of characters is encoded as a multiplicity of discrete phases of an electric wave. Each of the discrete phases is broken down into components proportional to the sine and cosine of the chosen phase angle by means of weighted resistors. In turn each sine and cosine component is placed in mutually quadrature relationship by being separately amplitude-modulated onto orthogonal phases of a single carrier wave. Each orthogonal phase appears as a double-sideband, suppressed-carrier signal. A single transmission wave is formed by combining the modulated orthogonal carrier phases in such a way that each character is represented by an equal-energy wave burst occupying a minimum of spectral bandwidth. The single composite wave can be translated in an additional modulating step to any part of the frequency spectrum.

The transmitted wave preserves the quadrature phase relationship of the chosen angle components and these components can readily be recovered in a receiver located at a distance from the transmitter. After reconstitution of the carrier frequency at the receiver by any conventional technique, the orthogonal sine and cosine modulating components are separated into two channels. For each channel a bank of weighting resistors matching those in the transmitter is provided to operate on the recovered sine and cosine proportioned components. These components, after weighting, are applied to a comparator which determines the pair with the maximum amplitude as representative of the encoded data character.

In this first aspect of the invention the encoded sine and cosine components represent the absolute phases assigned to the data alphabet. Carrier recovery in absolute phase systems is generally performed under less than optimum conditions.

In another aspect of this invention the data alphabet is encoded on a differential or relative phase basis. According to this aspect of the invention a variable reactance oscillator is used to generate a high-frequency wave. The phase of this oscillator, rather than remaining fixed, is adjusted between characters to the phase last transmitted by feeding back the delayed prior phase to the oscillator. The encoded character is thus represented in the composite transmitted wave by the difference in phase at successive character intervals. After an additional modulation step the resultant wave is translated to the center of the transmission band of a suitable medium, such as a telephone line.

The problem of recovering the carrier wave at the receiver in proper phase is greatly alleviated. At the receiver the same type of variable reactance oscillator as found in the transmitter is controlled in phase from character to character by delaying the incoming wave by one character interval. The incoming wave is first translated in a preliminary modulation step to the high-frequency level of the oscillator. Demodulators then produce outputs corresponding to the sine and cosine components of the encoded relative phase. Weighted resistor banks are again used to decode the corresponding data character. A comparator is further employed as in the first aspect of the invention to determine the combination with maximum amplitude as representative of the encoded data character.

A feature of this second aspect of the invention is that the same apparatus components can function as either transmitter or receiver. The only element not common to the two functions is the comparator.

According to a third aspect of the invention, analog signals can be encoded by employing continuously adjustable resistor banks proportioned in accordance with the sine and cosine functions and controlled by the rotation of an analog member whose position is to be transmitted. The position of the analog member is sampled at discrete time intervals and the position of brushes on the resistor banks determines the amount of resistance in series with a fixed amplitude potential source to establish the amplitude of appropriate sine and cosine proportioned signal components. At the receiver the outputs of sine and cosine demodulators are sampled at twice the transmission rate in accordance with Nyquist principles and held for a discrete time interval to be applied to matching continuously adjustable resistor banks. A maximum detector monitors the output of the resistor banks and through a closed servo feedback loop adjusts brushes on the resistor banks for maximum output. A shaft or dial on the brush shaft can indicate the encoded phase on an appropriate display or recording device.

Another feature of this invention is that any number of discrete phases can be transmitted by changing the resistor banks accordingly. No other parts of the system need be changed.

A complete understanding of this invention will be obtained from the following detailed description and the drawing in which.

Figure 1:
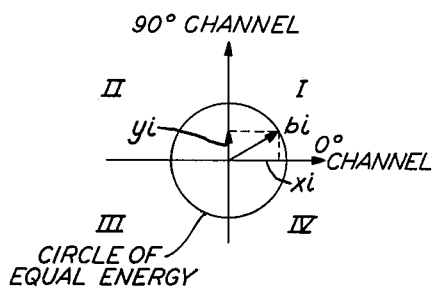
FIG. 1 is a phase diagram showing the relationship between the phases to be transmitted and the respective sine and cosine components.

FIG. 1 is a polar phase-angle diagram divided into four quadrants designated by Roman numerals. The radius of the circle is proportional to the energy of a signal to be transmitted. A data alphabet is to be established each character of which is to be represented by a discrete phase angle. These angles are preferably equally spaced and for binary encoding $2^n$ angles are chosen where $n$ is any integer. It is desired to transmit discrete phase angle information to a remote destination. According to this invention, projections of the phase angle on the horizontal and vertical axes of the polar diagram are modulated onto $0°$ and $90°$ phase orthogonal carrier waves of the same frequency.

If vector $b_i$ is representative of any discrete phase angle $\varphi_i$, the projections on the horizontal and vertical axes are $$x_i = A_0 \cos \varphi_i \qquad (1)$$
$$y_i = A_0 \sin \varphi_i \qquad (2)$$

Here $x_i$ and $y_i$ are the amplitude values on the horizontal and vertical axes, respectively, and $A_0$ is the uniform amplitude of all vectors, i.e., the radius of the circle of equal energy. Also, $$\varphi_i = b_i \frac{2\pi}{N} \qquad (3)$$

where $\varphi_i$ is the chosen angle for the $i$th character of the data alphabet, $b_i$ is the $i$th character, and N is the number of characters in the data alphabet. The square root of the sum of the squares of the horizontal and vertical projections is constant and, therefore, the energy per character is constant.

We can modulate the horizontal component on a cosine wave and the vertical component on a sine wave at any carrier frequency and obtain $0°$ channel and $90°$ channel amplitude-modulated signals as follows:

The $90°$ channel is represented as $$C(t) = A(t) \cos \omega t \cos \varphi_i \qquad (4)$$

By a well known trigonometric transformation $$C(t) = \tfrac{1}{2} A(t) [\cos (\omega t - \varphi_i) + \cos (\omega t + \varphi_i)] \qquad (5)$$

where $\omega$ is the carrier frequency in radians and $A(t)$ is an amplitude factor.

Similarly, the $0°$ channel is represented as $$S(t) = A(t) \sin \omega t \sin \varphi_i \qquad (6)$$

which can be transformed into $$S(t) = \tfrac{1}{2} A(t) [\cos (\omega t - \varphi_i) - \cos (\omega t + \varphi_i)] \qquad (7)$$

Equations 5 and 7 are readily recognized as double-sideband, suppressed-carrier signals. Since they are modulated on orthogonal phases and are thus entirely independent, they can be combined into a single composite wave without loss of identity. Thus, the composite wave is $$L(t) = C(t) + S(t) = A(t) \cos (\omega t - \varphi_i) \qquad (8)$$

Further analysis will show that it is immaterial which channel is multiplied by the sine or cosine of the carrier frequency. Substantially the same composite wave indicated by Equation 8 results in either case, except for a $90°$ rotation to the form:

$$L(t) = A(t) \sin (\omega t + \varphi_i)$$

This invention provides apparatus for effecting the transformation of phase-encoded data signals into an amplitude-modulated line signal in accordance with the above equations.

A line signal of the form of Equation 8 can be demodulated if orthogonal components are available at the receiver. The baseband cosine component can be recovered by multiplying the line signal by the cosine of the carrier frequency. Thus:

$$C'(t) = A(t) \cos (\omega t - \varphi_i) \cos \omega t$$
$$= \tfrac{1}{2} A(t) [\cos (2\omega t - \varphi_i) + \cos \varphi_i] \qquad (9)$$

A low-pass filter will reject the double frequency and yield $$C''(t) = \tfrac{1}{2} A(t) \cos \varphi_i \qquad (10)$$

Similarly, the sine component can be recovered by multiplying the line signal by the sine of the carrier frequency. Thus:

$$S'(t) = A(t) \cos (\omega t - \varphi_i)(-\sin \omega t)$$
$$= \tfrac{1}{2} A(t) [-\sin (2\omega t - \varphi_i) - \sin \varphi_i] \qquad (11)$$

After low-pass filtering the baseband signal is $$S''(t) = \tfrac{1}{2} A(t) \sin \varphi_i \qquad (12)$$

If the two baseband signals of Equations 10 and 12 are passed through weighting resistors exactly matching those in the transmitter, terms proportional to $\sin^2 \varphi_i$ and $\cos^2 \varphi_i$ are obtained. By adding these together a fixed level output is obtained. Only one pair of matched resistors can produce this fixed maximum level.

This invention further provides apparatus for effecting the demodulation of the amplitude-modulated line signal of Equation 8 into baseband form and for weighting these baseband signals to recover the encoded data character.

Apparatus having the capability of operating on phase-encoded data signals in accordance with the above equations have the following advantages. Since two double-sideband amplitude-modulated channels are interleaved phase orthogonally, most efficient use of the frequency spectrum is made. The energy per character is constant. Nyquist's criteria for efficient bandwidth utilization are satisfied as laid down in his paper "Certain Factors Affecting Telegraph Speed," published in the Bell System Technical Journal, volume III, Number 2, of April 1924. Errors in providing exactly phased carrier waves at the receiver merely result in a rotation of both transmitted phases without disturbing the separation between them.

Figure 2:
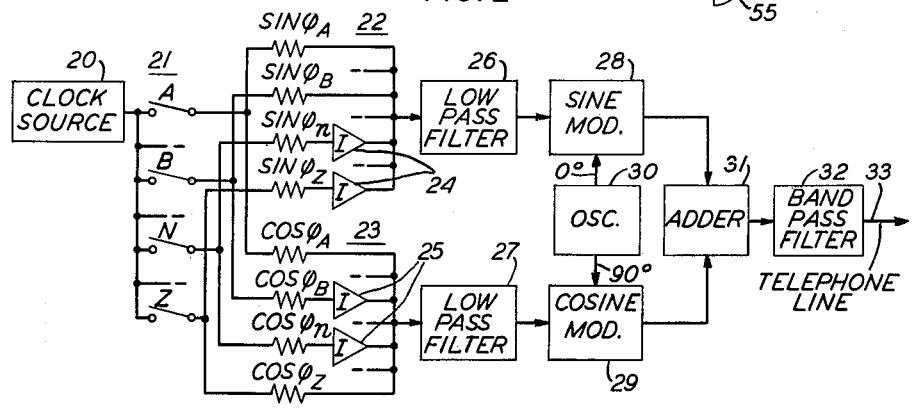
FIG. 2 is a block diagram of an absolute phase transmitter according to this invention.

FIG. 2 shows a simplified block diagram of a transmitter for a data alphabet according to this invention. Clock source 20 emits a standardized pulse at regular intervals to establish a transmission bit rate. The clock output appears on a common lead to which is connected a plurality of contacts generally designated 21. One of these switches is closed during each clock interval to convey a message. Four such switches are shown designated A, B, N, and Z.

The switches may be activated by a typewriter or a tape reader, for example. Assume for purposes of illustration that there are $2^n = 16$ data characters to be transmitted. Each character is then assigned a discrete multiple of 22.5 degrees, i.e., $A = 22.5°$, $B = 45°$, and so forth. Two banks of weighting resistors 22 and 23 symbolically designated $\sin \varphi$ and $\cos \varphi$ with a subscript corresponding to the switch designation, are provided and each has a common output point. One resistor of each group is connected at its input side to one of the data switches. The resistors in each group are proportioned to yield at the common output point the sines and cosines of the assigned angle. The sine of 22.5 degrees is approximately 0.384 and the cosine is about 0.924. If the impedance at the common point is 100 ohms, for example, the resistor marked sin $\varphi_A$ would have a value of approximately 160.4 ohms. Similarly, the resistor designated cos $\varphi_A$ would have a value of approximately 8.2 ohms. The values for any other chosen angle would be calculated on the basis that the weighting resistor and the input impedance of the modulator form a voltage divider. Therefore, the resistance value for any given angle equals $R_i(1-\sin \varphi)/\sin \varphi$ or $R_i(1-\cos \varphi)/\cos \varphi$, where $R_i$ is the input impedance of the common point. For sin 90° and cos 0°=1 the weighting resistor would be a direct connection. For sin 0° and cos 90°=0, the weighting resistor would be infinite or an open circuit.

As is apparent from FIG. 1 the chosen discrete angles also lie in all four quadrants of the phase diagram. For angles in which the sine or cosine function is negative a polarity inverter, such as is indicated by numerals 24 and 25, is placed in series with the weighting resistors. The clocked keying pulses are assumed to be of uniform amplitude and polarity on each lead.

It should be noted that the absolute values of the sines and cosines of angles in the several quadrants are repeated. For example, the absolute value of the sines of 45°, 135°, 225° and 315° is 0.707. Therefore, the resistive values calculated for one quadrant are usable in each of the other quadrants.

In the alternative, positive and negative components may be distinguished in other ways. A sharp dipulse may be used instead of a unidirectional pulse in each of the clock intervals for keying. Diodes are then placed in series with the weighting resistors. Character A is assumed to be in the first quadrant. Therefore, a positively poled diode would be placed in series with the sine weighting resistor sin $\varphi_A$ and a positively poled diode, in series with the cosine resistor cos $\varphi_A$. Only the positive half-cycle of the dipulse would then be effective at the weighting resistor. Character B is assumed to be in the second quadrant where sines are negative and cosines are positive. Therefore, a negatively poled diode would be placed in series with the sine resistor sin $\varphi_B$ to respond to the negative half of the input dipulse and positively poled diode would be placed in series with the cosine resistor cos $\varphi_B$. The characters N and Z are assumed to lie in the third and fourth quadrants and the corresponding weighting resistors would be placed in series with appropriately poled diodes. The common output of the sine resistors is connected to the sine modulator and the common output of the cosine resistor to the cosine modulator, as in FIG. 2.

As a further alternative for separating positive and negative components using a unidirectional keying pulse, components could be segregated according to their sense and a common inverter used for all negative components. Therefore, the sine resistors, sin $\varphi_A$ and sin $\varphi_B$, for characters A and B would go directly to the sine modulators and the sine resistors, sin $\varphi_N$ and sin $\varphi_Z$, for characters N and Z would be placed in series with a single inverter before going to the sine modulator. Similarly, cosine resistors connected to A and Z leads would go directly to the cosine modulator and those connected to B and N leads would be in series with an inverter.

However negative and positive sine and cosine components are distinguished, the resultant pulses require shaping since the pulse spectrum is theoretically infinite. It is intended to modulate the pulses on a carrier frequency in the voice band. To avoid foldover, therefore, the respective sine and cosine components are shaped in respective low-pass filters 26 and 27 shown in FIG. 2 in order to remove high-frequency spectral elements. The cutoff for the filters is established somewhat less than the frequency of the carrier on which they are to be modulated.

The shaped pulse outputs of filters 26 and 27 are applied to separate modulators 28 and 29 in FIG. 2 to be modulated on quadrature carrier waves from oscillator 30. Oscillator 30 can have a frequency in the voice frequency band, for example, and is assumed to include a 90° phase shifter in series with its 90° output. The orthogonal phases are designated 0° for sine modulator 28 and 90° for cosine modulator 29. Modulators 28 and 29 can conveniently be balanced switching type modulators in which the phase of the carrier component is transmitted directly or reversed in phase depending on whether the sine or cosine component of the keying pulse is positive or negative. The transmitted carrier amplitude depends on the weighted amplitude of the keying pulse. The outputs of the modulators are therefore double-sideband suppressed-carrier amplitude-modulated waves of the same frequency but always 90° out of phase. Therefore, the two waves are entirely independent and mutually non-interfering. The two modulated waves are combined in linear adder 31 to produce a single composite wave. Adder 31 can comprise a resistor matrix. Bandpass filter 32 shapes the wave for optimum compatibility with the bandwidth of the telephone line 33 and to reduce line distortion.

Figure 4:
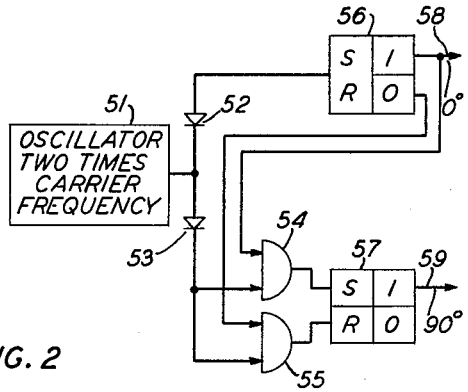
FIG. 4 is a block diagram of a carrier wave generator providing orthogonal outputs useful in the practice of this invention.

FIG. 4 is a digital alternative to the use of a phase-shifting network in generating quadrature carrier components. The respective outputs are locked in quadrature phase. A digital system is convenient here because the square-wave outputs are readily compatible with the switching type modulators 28 and 29 in FIG. 2. A stable carrier wave source 51 operating at twice the ultimate carrier frequency has its output connected to two bistable flip-flop circuits 56 and 57 as shown in FIG. 4. A double-frequency carrier wave has transitions across the zero axis every 90 degrees of the carrier wave itself. The bistable circuits may be of any conventional type with set S and reset R inputs. An input at S causes a marking "1" output and an opposite "0" output. Similarly, an input at R causes the opposite effect. If the S and R leads are connected together successive inputs of the same polarity cause a change of state in the bistable circuit. The output of oscillator 51 is applied through negatively poled rectifier 52 to the two inputs of bistable circuit 56 and the "1" output on lead 58 is therefore a square wave at half the oscillator frequency and initially in phase with the negative half cycles of the oscillator output. Bistable circuit 57, on the other hand, has its S and R inputs connected to the output of oscillator 51 through positively poled rectifier 53 and AND-gates 54 and 55. AND-gates 54 and 55 are alternately enabled and disabled, and consequently locked, to the output of bistable circuit 56, as shown. The separate AND-gate outputs are applied respectively to the S and R inputs of bistable circuit 57. Clearly, bistable circuit 57 is set when there is a "1" output from bistable circuit 56 and the output of the oscillator is positive. Likewise, it is reset when there is a "0" output from bistable circuit 56 and the oscillator output is positive. Therefore, bistable circuit 57 counts down from the positive cycles of the oscillator wave in synchronism with the output of bistable circuit 56. Its output is a square wave also at half the oscillator frequency and the "1" output on lead 59 is displaced 90° from the output on lead 58. These outputs on lines 58 and 59 can be applied to the modulators 28 and 29, respectively, shown in FIG. 2 in place of the outputs of oscillator 30.

Figure 3:
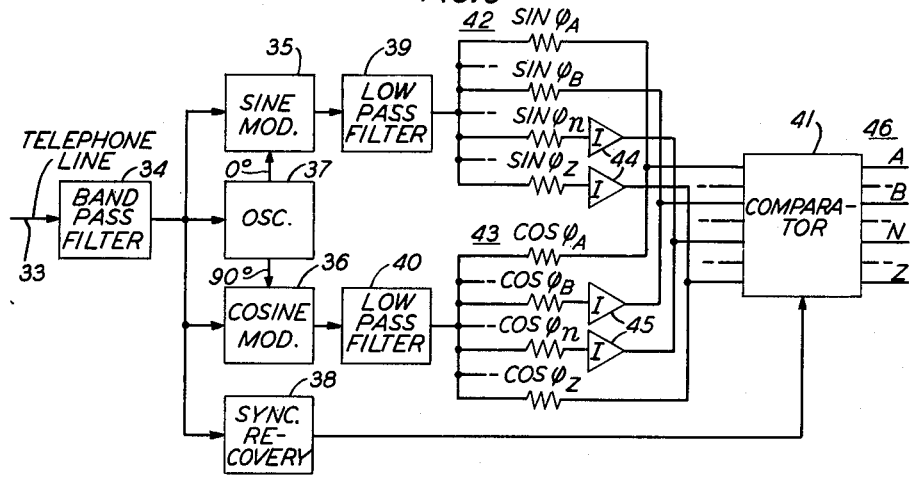
FIG. 3 is a block diagram of an absolute phase receiver according to this invention.

FIG. 3 is a diagram of a receiver for the line signal generated in the transmitter of FIG. 1. The incoming composite signal on telephone line 33 is sent through a bandpass filter 34 to screen out any out-of-band noise generated in the telephone line. The output of filter 34 is applied in parallel to a sine modulator 35, cosine modulator 36, oscillator 37 and synchronization recovery circuit 38. Oscillator 37 may be a local oscillator synchronized on a flywheel basis from the incoming signal and controlled by well known techniques to the reference phase to conform to Equation 9 and 11. Its output is divided into quadrature components using a phase splitter or the digital system of FIG. 4. The 0° component demodulates the sine component in modulator 35 and the 90° component, the cosine component in modulator 36. The outputs of the modulators include components proportional in amplitude to the sine and cosine components of each phase angle encoding a data character, as well as second harmonic components of the carrier frequency as already explained. Low-pass filters 39 and 40, having the same cut-off frequency as low-pass filters 26 and 27 in FIG. 2, remove the double-frequency carrier components. The sine and cosine components are applied to separate weighting-resistor banks 42 and 43. These match exactly the weighting banks 22 and 23 in the transmitter, provided the input impedance at the comparator is the same as the input impedance of the transmitter modulators. The values of the weighting resistors are calculated in the same way as those in the transmitter. The reason for the weighting resistors in the receiver is to make it possible to perform a scalar addition in the comparator according to the equation $$\sin^2\varphi + \cos^2\varphi = 1 \qquad (13)$$

Polarity inverters 44 and 45 are added in series with the weighting resistors where necessary to bring all components to the same polarity.

The outputs of the sine and cosine weighting resistors are paired for each data character and connected to separate input leads of comparator 41. The comparator has an output lead 46 for each data character as shown. The comparator is in effect a maximum detector which produces an output on only one lead at a time. The weighted sum from only one pair of resistors will equal the maximum level implicit in Equation 13 for a given transmitted character. The comparator output is sampled in time with the output of synchronization recovery circuit 38.

Figure 10:
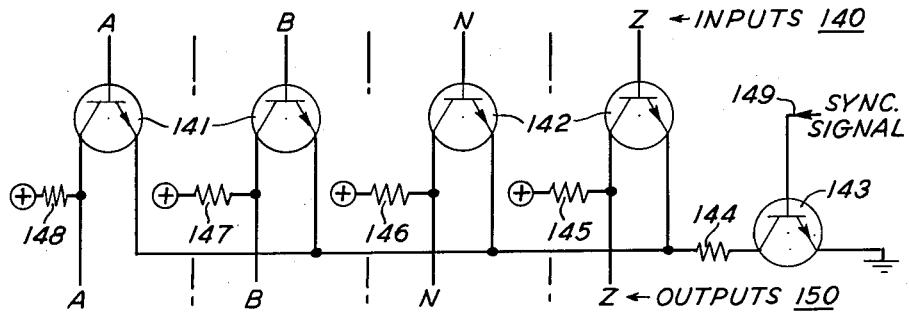
FIG. 10 is a diagram of a comparator circuit useful in the practice of this invention.

Comparator 41 may conveniently be constructed according to the circuit of FIG. 10. Here there is shown a transistor 141 or 142 for each input lead 140, each of which connects to a pair of weighting resistors. The base electrode of each transistor is connected to a separate input lead as shown. All emitters are returned to a common resistor 144. Each collector is returned to a common potential source (shown as an encircled plus sign) through an individual load resistor 145 through 148, for example. An output lead 150 exists corresponding to each input lead. Corresponding input and output leads are designated by the same letter A, B, N or Z. The common emitter resistor reaches ground through an additional gating transistor 143 to the base of which the synchronization signal is applied on lead 149. Once one transistor draws current the potential drop across emitter resistor 144 is sufficient to hold the other transistors cut off. Therefore, the potential on only one output lead drops toward ground to produce a usable indication. The output leads can be connected to a recorder such as a page printer or tape perforator.

Any one of a number of schemes may be employed to synchronize the transmitter and receiver of FIGS. 2 and 3. Carrier may be transmitted to control the local oscillator in FIG. 3 by slightly unbalancing one of the modulators 28 or 29 in FIG. 2 to allow a carrier component to leak through. Additional carrier can be inserted in adder 31. Local oscillator 37 in FIG. 3 can also by synchronized with the second harmonic of the carrier present in the line signal by providing a frequency divider in tandem therewith.

Figure 8:
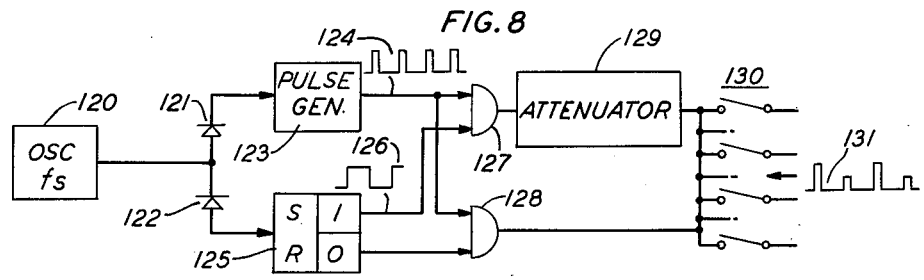
FIG. 8 is a block diagram of a circuit for including synchronization information in the transmitting system of this invention.

A clock signal can be reconstructed at the receiver by several techniques. For example, the overall signal can be amplitude modulated by an additional component at half the clock frequency. A specific embodiment of such a system is shown in FIG. 8. Here an oscillator operating at the clock frequency $f_s$ has its output separated into positive and negative components by means of rectifiers 121 and 122. The positive half-cycles are shaped in pulse generator 123, which may be a one-shot multivibrator, to produce pulses as shown in waveform 124 at the clock rate. The negative half-cycles drive bistable circuit 125 to produce a square wave 126 at the frequency $f_s$. The output of pulse generator drives AND-gates 127 and 128, which are alternately enabled by the "1" and "0" outputs of flip-flop circuit 125, as shown. An output pulse at full amplitude appears in the output of AND-gate 128 at half the clock rate $f_s$. The output of AND-gate 127 is applied to attenuator 129, which may be adjusted to halve the pulse amplitude. The outputs of gate 128 and attenuator 129 are applied to a common lead, to which all data switches 130 are connected. The signal appearing on the common lead is that of waveform 131, which is a succession of pulses at full and half amplitude. The envelope of the pulses is a sine wave at half the clock rate. The circuit of FIG. 8 may be substituted for clock 20 shown in FIG. 2. In this way alternate data characters have different total energies. The amplitude modulation could also be imposed in sinusoidal form at any other common point in the transmitter, such as in adder 31.

Figure 9:
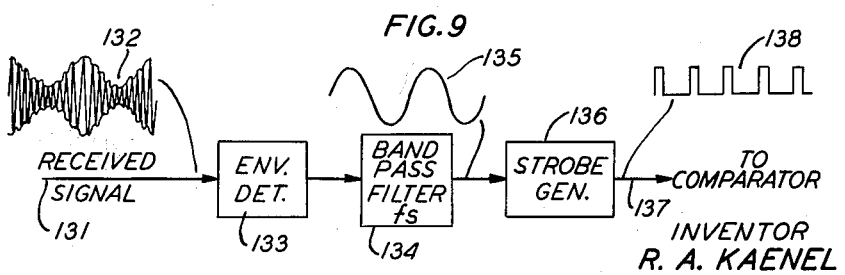
FIG. 9 is a block diagram of a synchronization recovery circuit useful in a receiver according to this invention.

At the receiver the clock pulses are readily generated from this additional amplitude modulation as shown in FIG. 9. The circuit of FIG. 9 could be used as synchronization recovery circuit 38 in FIG. 3. The incoming signal on line 131 resembles that of waveform 132. The envelope is recovered in envelope detector 133, which may be of a known type. The detector output is smoothed in bandpass filter 134 centered at half the clock frequency. The output appears as in waveform 135. The transitions of this wave at half the clock frequency are detected in strobe generator 136 to reproduce the clock pulse wave 138 on output lead 137. Since the comparator is a maximum detector, it is immaterial that successive transmitted characters appear at different total amplitudes. The sine and cosine components remain at the correct relative amplitudes.

Figure 5:
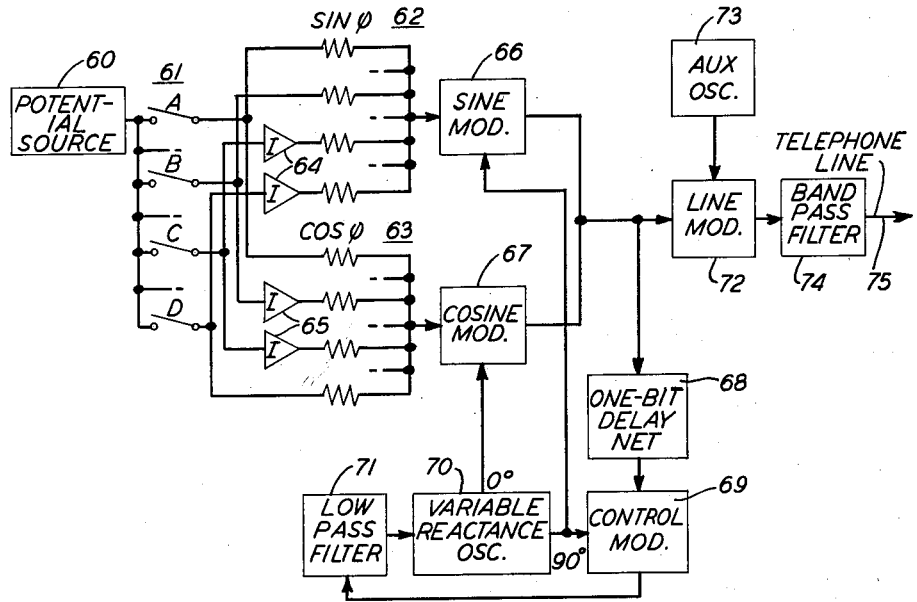
FIG. 5 is a block diagram of a differential phase transmitter according to this invention.
Figure 6:
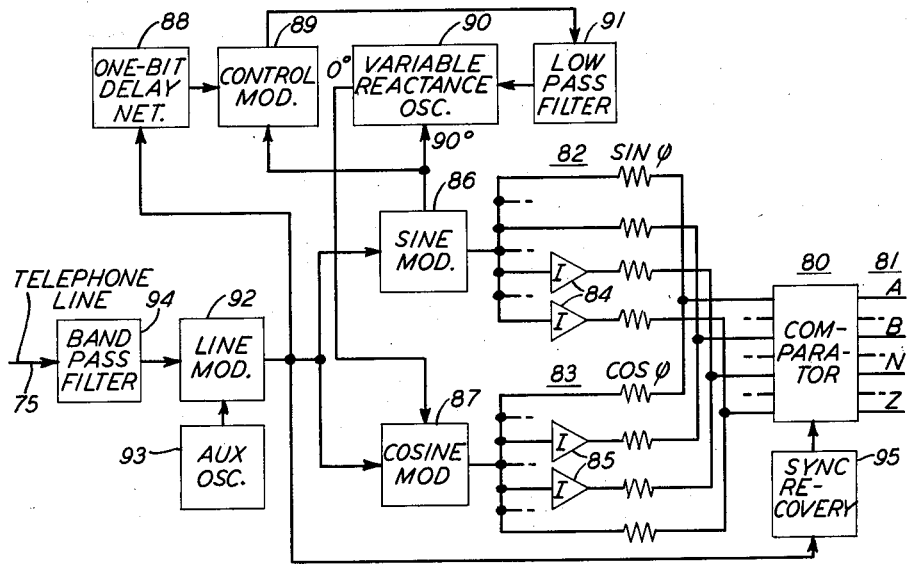
FIG. 6 is a block diagram of a differential phase receiver according to this invention.

FIGS. 5 and 6 together show a multiphase data transmission system according to this invention which relies on the transmission of differential phase rather than absolute phase information. Data characters are encoded as the phase change between successive character intervals. Use of this system makes possible a more positive control of the receiver local oscillator.

In FIG. 5 the data input leads, weighting-resistor bank and modulators are the same as in the absolute phase system of FIG. 2. Potential source 60 supplies a fixed level voltage to a common lead. Switches 61 connect to this common lead and are opened and closed back-to-back without producing any gap or interval between characters. A particular switch 61 is closed according to the character A, B, N or Z to be transmitted and the pulse is weighted in resistor banks 62 and 63 as before. Only one switch at a time is to be closed at some synchronous rate. Inverters, such as 64 and 65, are inserted in series with the resistors depending on the quadrant in which the signal is encoded. The outputs of the sine and cosine banks are applied to sine and cosine modulators 66 and 67. Instead of a fixed phase carrier wave generator a variable reactance oscillator 70 of high frequency relative to the voice band is employed. This oscillator has quadrature outputs in 0° and 90° phases, which are applied respectively to the cosine and sine modulators. The frequency of the oscillator is established at a high enough frequency to avoid foldover due to high frequency components in the pulse spectra, thereby eliminating the low-pass filters employed in the absolute phase system. The first character to be transmitted assumes whatever absolute phase is determined by the oscillator running free. Now a phase-locked loop comes into play. This comprises one-bit delay network 68 connected to the combined output of the two modulators, control modulator 69 controlled by the output of the delay network and also connected to the 90° output of oscillator 70, and a low-pass filter 71 connected between the output of modulator 69 and the control input of oscillator 70.

The delay network has a resultant carrier output at the phase represented by the composite output signal. Modulator 69 then has in its output a direct-current component equal to the difference in phase between the transmitted signal and the 90° output of oscillator 70. This component is separated in filter 71 and changes the phase of oscillator 70 until there is no difference in phase between the last-transmitted signal and the oscillator output. The new phase is fed into the modulators and the next data character phase determined by the next switch closing is superimposed on this new phase. Thus, the difference in phase between successive transmitted signals is equal to the encoded data character phase. The transmitter signal is again a double-sideband amplitude-modulated carrier signal. It may be advisable in a practical system to precede each message with a number of arbitrary start signals to condition the apparatus properly, as will be appreciated.

The high-frequency carrier signal may be translated to any part of the frequency spectrum, such as the voice frequency band, by the use of auxiliary oscillator 73 and line modulator 72 in the well known manner as in a multiplex system. Bandpass filter 74 shapes the signal to the frequency range of the transmission line 75. This translation is also useful in frequency multiplex carrier systems where more than one simultaneous message is being transmitted.

FIG. 6 is a diagram of a receiver for decoding the signal generated in the transmitter of FIG. 5. The incoming signal on line 75 is first filtered in bandpass filter 94 to remove out-of-band noise and is then translated to the high-frequency band in line modulator 92 with the aid of auxiliary oscillator 93, which operates at the same frequency as oscillator 73 in FIG. 5. The output of modulator 92 is applied in parallel to one-bit delay network 88, sine and cosine demodulators 86 and 87, and synchronization recovery circuit 95. A phase-locked loop exactly paralleling that in the transmitter of FIG. 5 is used to provide the orthogonal carrier components necessary to separate the two channels of data information. Variable reactance oscillator 90 operates at the same frequency as oscillator 70 in FIG. 5. Control modulator 89 extracts the phase difference between the oscillator output and the phase encoded in the last transmitted data character. The direct-current component proportional to the phase difference is isolated from the output of modulator 89 in low-pass filter 91. Oscillator 90 is therefore pulled into phase with the last transmitted signal character. The quadrature outputs of oscillator 90 effectively demodulate the sine and cosine signal components in sine and cosine modulators 86 and 87. The outputs of these modulators therefore transform the differential phase into absolute phase.

Weighting-resistor banks 82 and 83 with inverters, such as 84 and 85 employed as necessary, and comparator 80 produce character-representing outputs on leads 81 in the same manner as the absolute phase receiver of FIG. 3.

Synchronization recovery circuit 95 can operate from the phase transitions between successive signals to generate gating pulses for comparator 80.

It is evident from an inspection of FIGS. 5 and 6 that there is a one-for-one correspondence between all receiver and transmitter elements except comparator 80 with its synchronization recovery circuit 95. All modulators are bidirectional devices. Only the inverters are unidirectional. A combined transmitter-receiver with parts interchangeable in fuction therefore suggests itself. Such a combination is shown in FIG. 7.

Figure 7:
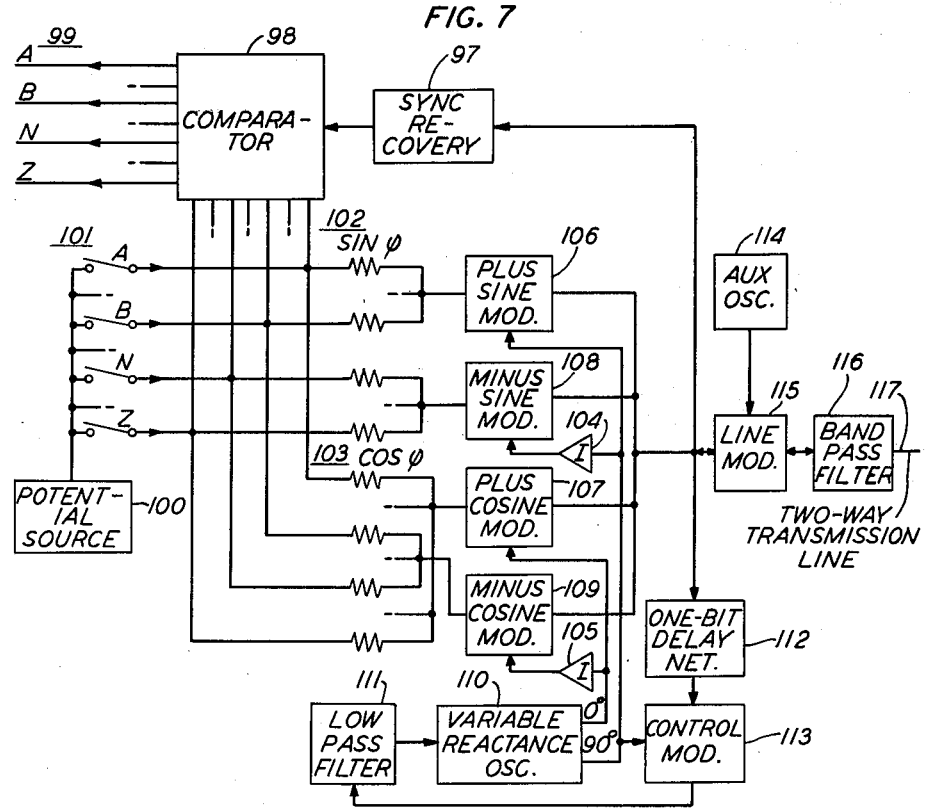
FIG. 7 is a block diagram of a differential phase transceiver according to this invention.

In FIG. 7 a multiphase data transceiver includes the following elements which are shared for both transmitting and receiving functions: sine and cosine weighting-resistor banks 102 and 103, sine and cosine modulators (demodulators in receiving phase) 106 through 109, variable reactance oscillator 110, low-pass filter 111, control modulator 113, delay network 112, auxiliary oscillator 114, line modulator 115, bandpass filter 116 and transmission line 117. Input switches 101, connected in common to the output of potential source 100 are unique to the transmitting phase. Output leads 99, synchronization recovery circuit 97 and comparator 98 are reserved for the receiving function.

An alternative system for handling plus and minus sine and cosine components of the encoded intelligence is illustrated. Since the inverters are one-way devices, they are removed from the signal paths to avoid switching problems. Instead, separate modulators are provided for each polarity. The control phases from oscillator 110 are applied in opposite sense to the separate modulators as shown. For example, plus sine modulator 106 is controlled directly by the 90° output of oscillator 110, while minus sine modulator 108 is controlled by the 90° output of oscillator 110 after inversion in inverter 104. Similarly, minus cosine modulator 109 is supplied with an inverted 0° output of oscillator 110 through inverter 105. The weighting resistors are then grouped according to whether they are plus or minus and connected to the appropriate modulator as shown. Representative characters A, B, N and Z are assumed to lie in the respective four quadrants of the phase diagram.

Inspection of FIG. 7 and comparison with FIGS. 5 and 6 reveal that the operation in transmitting and receiving phases is identical to that already described.

Figure 11:
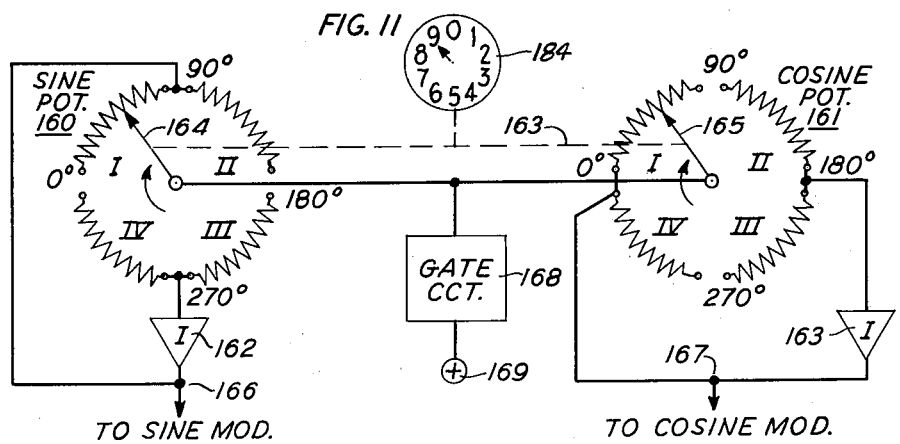
FIG. 11 is a diagram of a continuously adjustable resistor bank useful in the practice of this invention for transmitting analog signals.

It is also possible to use the multiphase system of this invention to transmit and receive analog information in discrete samples if the weighting resistor banks are made continuous. FIG. 11 illustrates as possible arrangement for the weighting banks. The weighting banks are constructed in the form of potentiometers as indicated by elements 160 and 161. Each bank is divided into four segments, marked by Roman numerals, to correspond to the four quadrants of the phase diagram of FIG. 1. Each quadrant is tapered according to the sine and cosine function and the input impedance of the modulator or comparator into which it works to yield at the output points 166 and 167 a potential proportional to the sine and cosine of the angle assumed by the brushes 164 and 165 measured from some reference point, such as the point marked 0°. The quadrants are separated at the points corresponding to sine 0° and 180° and cosine 90° and 270° because the value at these angles is zero. A stable direct voltage source is connected at point 169 designated with an encircled plus sign. Point 169 extends to the rotors of both potentiometers through a gate circuit 168 by means of which sampling times are controlled in any convenient way. Potentiometer 160 is the sine potentiometer and potentiometer 161 is the cosine potentiometer. The corresponding output points are designated 166 and 167. Since sines are positive in the first and second quadrant the junction between the corresponding sectors is connected directly to output point 166. The junction of the third and fourth quadrants is connected to output point 166 through inverter 162 since in these quadrants the sine is negative. Similarly, on the cosine potentiometer the junction of the first and fourth quadrants is connected directly to output point 167 and the junction of the second and third quadrants is connected thereto through inverter 163.

The taper of the potentiometer can be calculated on the same basis as the values of the individual resistors as described above. The values depend, of course, on the input resistance of the modulator or comparator into which the potentiometers feed. The output impedance could be established by small resistors at points 166 and 167, if desired. Attached to the shaft on which the rotors are located can be an analog device such as a meter dial 184 for a watthour meter. Gate 168 is to be closed at any time it is desired to sample the setting of the analog member. The potentiometers of FIG. 11 can be used to replace the weighting resistors in either FIG. 2 or FIG. 5 in an obvious manner.

Figure 12:
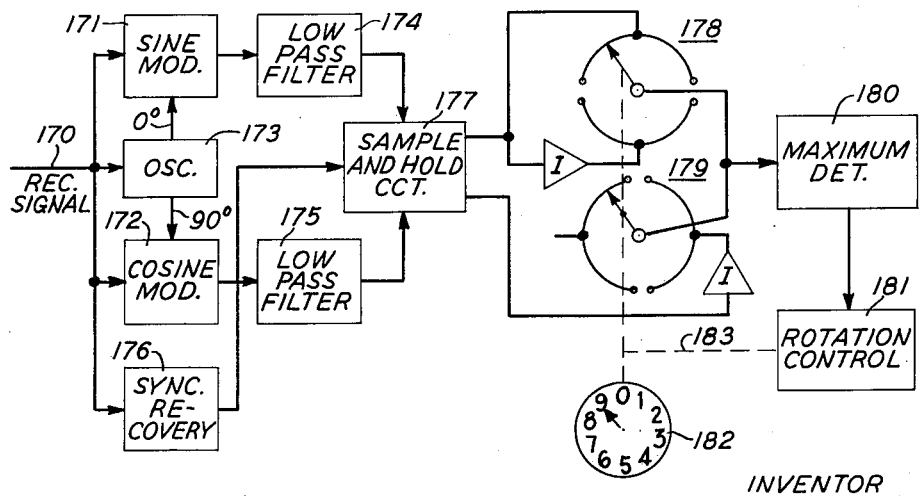
FIG. 12 is a block diagram of a receiver for analog signals according to this invention.

The receiver for the analog multiphase signal is more complex than for the digital systems previously discussed as shown in FIG. 12. The incoming signal on line 170 is split into its sine and cosine channels in modulators 171 and 172 with the aid of carrier recovery oscillator 173 as in the receiver of FIG. 3. The outputs of the modulators 171 and 172 are applied through low-pass filters 174 and 175 to a conventional sample and hold circuit 177 where the amplitude of the individual sine and cosine components is stored for a sample interval. The sampling interval is determined by the outputs of synchronization recovery circuit 176. The sample and hold output is applied to potentiometer circuits 178 and 179 similar to those in FIG. 11. Inverters are included in the potentiometer circuits in appropriate quadrants as indicated. The rotors on the two potentiometers are ganged together as indicated by dashed line 183 and to an indicator dial 182. The outputs of the potentiometers are combined and applied to detector 180. The output of detector 180 is connected to a conventional rotation control circuit 181, which establishes the position of the rotors on the potentiometers. Since any given pair of sine and cosine components has a constant known sum, detector 180 can be constructed to yield an output proportional to the difference between this constant sum and the signal resulting from the arbitrary position of the potentiometer rotors. Rotation control 181, a servo type control, acts to adjust the rotors of the potentiometers until the output thereof is equal to the constant sum. Then the setting of dial 182 corresponds to this position of the rotors on the transmitter potentiometer.

While this invention has been disclosed by the use of specific illustrative embodiments, other applications of the system of the invention will occur to those skilled in the art.

What is claimed is:

1. A system for translating phase information into an amplitude-modulated carrier wave signal comprising
    first resistive means for deriving from a given phase vector components proportional to the sine and cosine of the vector angle,
    a carrier wave source producing two orthogonal components of the same frequency,
    means for amplitude modulating the respective orthogonal components in the output of said wave source with the sine and cosine components from said deriving means,
    means for combining the modulated orthogonal components into a single output wave at said carrier frequency for transmission to a remote point,
    means at said remote point for separating said sine and cosine components from said output wave,
    further resistive means for combining said separated components into resultant signals representative of possible transmitted phase vectors,
    and means for selecting the signal from said further resistive means of maximum amplitude as the most probable transmitted phase.

2. The system in accordance with claim 1 in which said phase information is constituted of a finite number of discrete equally spaced phase angles,
    said first and further restrictive means comprise banks of individual resistors in two groups,
    one group including a separate resistor for each discrete phase angle proportioned according to the sine of the angle and the other group likewise including a separate resistor for each discrete phase angle proportioned according to the cosine of the angle,
    the resistors in each group representing the same discrete angle being paired at one end,
    and all the resistors in each group being brought to common terminals at the opposite end,
    and a plurality of polarity inverting circuits one being placed in series with each individual resistor representing a phase angle lying in a quadrant in which the sine or cosine is in the negative sense.

3. The system in accordance with claim 1 in which phase information is constituted of any angle within a full circle,
    said first and further resistive means are potentiometers divided into four quadrants, the resistance in each quadrant being tapered in accordance with the sine or cosine of the angle between any point on the quadrant and the boundary of that quadrant,
    a rotatable brush makes sliding electrical contact with each potentiometer,
    access terminals on each potentiometer are positioned at the boundaries between adjacent quadrants representing sines or cosines of angles of the same polarity,
    and a polarity inverter is placed in series with the access terminals of quadrants representing angles whose sine or cosine is negative.

4. A data character transmission system in which individual characters are assigned discrete phase angles comprising
    a plurality of input leads corresponding to the individual data characters,
    first resistive means for developing a pair of components from a uniform pulse applied to any of the input leads proportional respectively to the sine and cosine of the angle assigned to a data character on that lead,
    separate common output points for all resistive means developing sine and cosine components, respectively,
    a carrier wave generator having phase-orthogonal outputs at a given frequency,
    separate means for modulating sine components from said separate output points onto one and cosine components onto the other of said carrier wave outputs,
    means for combining the modulated outputs of said modulating means into a single composite transmitted signal wave,
    means for receiving the wave transmitted by said combining means,
    a carrier wave detector responsive to said composite wave for producing orthogonal components at the given frequency,
    a pair of demodulators for mixing the orthogonal components from said detector with the transmitted signal wave to recover said sine and cosine components,
    second resistive means matching said first resistive means element for element and proportioned according to the sines and cosines of said assigned angles,
    means for applying the sine and cosine components recovered in said demodulators to said resistive means,
    means for pairing elements of said resistive means corresponding to the sine and cosine of each assigned angle, and
    a comparator connected to said pairing means for determining the pair with maximum signal combination as representing the data character transmitted.

5. In a data character transmission system a transmitter comprising
    a plurality of data character input leads,
    a pair of resistors connected to each of said input leads proportioned to develop outputs from an impulse on a given lead in accordance with the sine and cosine function of a discrete angle uniquely assigned to that data character lead, a first common junction for all resistors developing sine components, a second common junction for all resistors developing cosine components, a carrier wave generator having phase-orthogonal outputs, means for modulating the sine and cosine components appearing at said first and second common junctions on the respective orthogonal outputs of said oscillator, and means for combining the outputs of said modulating means into a single composite carrier wave.

6. A data character transmission system in accordance with claim 5 in which said carrier wave generator comprises a stable oscillator having a frequency twice that of said carrier wave, rectifier means for separating the positive and negative half-cycles in the output of said oscillator into separate paths, a first bistable circuit having complementary output points and an input point connected to the path supplying negative half-cycles of the oscillator output to produce complementing square waves at the frequency of said carrier wave, one of said square waves forming one of the orthogonal outputs of said generator, a second bistable circuit having an output point and set and reset input points connected to the path supplying positive half-cycles of the oscillator output to produce a square wave at the frequency of said carrier wave, and means for insuring that the output of said second bistable circuit is orthogonal to the output of said first bistable circuit comprising a pair of coincidence gates in series with the set and reset input points of said second bistable circuit, and circuit connections to said gates from the complementary outputs of said first bistable circuit to cause said gates to be alternately enabled and disabled.

7. The data character transmission system in accordance with claim 5 in which a low-pass filter having a cut-off frequency below the frequency of said carrier wave is placed in series with each of said first and second common junctions to remove spectral components at the frequency of said carrier wave.

8. In a data character transmission system in which a plurality of data characters are encoded as discrete phases of a carrier wave and the sine and cosine components of said phases are modulated orthogonally on said carrier wave, a receiver comprising means for generating an unmodulated carrier wave having orthogonal components, means for mixing the modulated carrier wave with the orthogonal components from said generating means to demodulate said sine and cosine components into separate channels, a plurality of resistors corresponding to each of said channels in cascade with said mixing means, the resistors in the sine channel being proportioned according to the sine of each discrete phase angle and the resistors in the cosine channel being proportioned according to the cosine of each discrete phase angle, means for pairing the output ends of the resistors in each channel representing the same discrete angle, and maximum detection means for monitoring the outputs of all pairs of resistors simultaneously, said means having an output lead corresponding to all possible discrete phases and producing an output on that lead corresponding to the phase angle at which a maximum amplitude signal is detected.

9. A data character transmission system in accordance with claim 8 in which said maximum detector means comprises a junction transistor having base, emitter and collector electrodes for each discrete phase to be detected, means connecting the base electrode of each transistor to the pair of resistors representing sine and cosine components of the same phase angle represented by the particular transistor, a potential source, a plurality of resistors connected between one terminal of said source and the collector electrode of each transistor, a load resistor connected between all emitter electrodes in common and the other terminal of said source to prevent more than one transistor from conducting at any one time, and an output lead connected to the collector electrode of each transistor.

10. The data character transmission system of claim 8 in which a low-pass filter having a cut-off frequency below that of said carrier wave is placed in series with the outputs of said mixing means to remove all carrier frequency components from the separate channels.

11. In a data transmission system in which a plurality of data characters are encoded as discrete differential phases from character to character, a transmitter comprising a plurality of input leads each designating a different data character, a pair of resistors connected to each of said input leads, the values of said resistors being proportioned in such a way that an impulse of fixed amplitude incident on each input lead is attenuated in accordance with the sine and cosine of the discrete phase angle assigned to a data character on that lead, means for grouping the output ends of said resistors according to whether they represent sine or cosine components of said angles, a pair of modulators connected one to each of said grouped resistors, a variable reactance oscillator having orthogonal outputs at a given frequency high with respect to any significant spectral components in the signal impulses, means for combining the modulated outputs of said modulators into a single composite transmitted wave, a delay network having a delay equal to one data character interval connected to the output of said combining means, a mixer for intermodulating the output of said delay network with an output of said oscillator to obtain a control signal, and a low-pass filter for coupling the control signal from said mixer to said oscillator to bring the latter into phase coincidence with the last-transmitted wave phase.

12. In a data character transmission system in which individual characters are transmitted as discrete differences in phase of a carrier wave between successive character intervals, a receiver comprising a variable reactance oscillator having orthogonal outputs at the frequency of said carrier wave, an input point for the received wave, a pair of demodulators connected to said input point and to the orthogonal outputs of said oscillator, a delay network having a delay equal to the interval between successive characters connected to said input point, a mixer for intermodulating the output of said delay network and an output of said oscillator to produce a control signal proportional to the difference in phase between the oscillator output and the phase of the carrier wave last received, a low-pass filter coupling the control signal from said mixer to said oscillator to bring its phase into coincidence with that of the last received data character signal, a resistive network divided into two groups, the individual resistors in each group being respectively proportioned according to the sines and cosines of the phase angles encoding said data characters, means for connecting the outputs of said demodulators to the respective groups in said resistive networks, and a comparator having an input lead connected to each pair of resistors in said resistive network representing the sine and cosine components of such discrete phase angle and an output lead for each possible data character, said comparator acting to determine the input lead with the maximum signal level and marking the output lead corresponding thereto.

13. In a data transmission system in which analog information is encoded as the absolute phase of a carrier wave, a transmitter comprising a pair of potentiometers each divided into four 90° quadrants, the resistance in each quadrant being tapered respectively according to the sine and cosine functions whereby a signal applied to any point on the quadrant is attenuated by the sine or cosine of the angle measured between the boundary of the quadrant and the location of the point, an analog member whose position is to be transmitted to a remote point, a pair of wipers ganged to each other and to said analog member and making electrical contact with the quadrants of said potentiometers, a pair of output leads on each potentiometer connected to the junctions of the quadrants developing respective positive and negative sine and cosine components.

a polarity inverter in series with the output leads from negative quadrants of said potentiometers, a junction point for the direct output lead and corresponding inverter output lead for each potentiometer, a stable oscillator operating at the frequency of said carrier wave and provided with orthogonal outputs, a pair of modulators each having one input point connected to one of said junction points and another input point connected to one of said oscillator outputs, the output of said modulators including sidebands of said carrier wave modulated with sine and cosine components of the phase angles being encoded, and a combining circuit for developing a composite transmitted signal from the output of both of said modulators.

14. In a data transmission system in which analog information is encoded on orthogonal carrier waves as sine and cosine components of arbitrary phase angles, a receiver comprising a carrier recovery circuit generating an unmodulated carrier wave having orthogonal outputs, means for intermodulating the received wave with the orthogonal outputs of said recovery circuit to demodulate the sine and cosine components of said received wave into separate channels, a holding circuit for storing the sine and cosine components in the outputs of said intermodulating means for an extended period, a continuously adjustable resistance bank for each of said channels, said banks being divided into four sectors tapered in accordance with the sine function to attenuate input components by the sine or cosine of the angle included between their junctions with adjacent sectors and a point of contact within the sector, a pair of wipers on each bank making sliding electrical contact therewith and having a common shaft, means for connecting the separate channel outputs of said holding circuit to said resistance banks, an inverter in series with the inputs of the sectors of the banks corresponding to negative sine and cosine components, a maximum signal detector connected to the wipers on said resistance banks having an output equal to the difference between a predetermined maximum signal level and the actual signal level, a servo control circuit responsive to the output of said detector coupled to the common shaft of said wipers for adjusting said wipers until the output of said detector is at a minimum, and an indicating device on the common shaft for displaying the analog information detected in the received signal.

No references cited.